Patented Mar. 5, 1946

2,396,076

UNITED STATES PATENT OFFICE 2,396,076

PREPARATION OF TRIFLUORO ACETIC ACID

Anthony F. Benning, Woodstown, N. J., and Joseph D. Park, Wilmington, Del., assignors to E. I. du Pont de Nemours & Company, Wilmington, Del., a corporation of Delaware No Drawing. Application September 24, 1943, Serial No. 503,654

4 Claims. (Cl. 260—539)

A. This invention relates to a method of making trifluoro acetic acid. Trifluoro acetic acid is a useful organic acid which has heretofore been made by the oxidation of trifluoro-methyl-cyclohexane with nitric acid (Bull. Acad. Roy. Belg. 8, 331 (1922)) and by the oxidation of trifluoro toluidine with chromic acid (ibid. 343 (1922)). Both processes use benzo-trifluoride as the starting material and are very slow and costly.

B. It is an object of this invention to prepare trifluoro acetic acid by a process superior to those in existence.

C. The objects of the invention are accomplished, generally speaking, by the acid hydrolysis of $CF_3CCl_3$. This is preferably carried out by reacting $CF_3CCl_3$ with oleum in the presence of a mercury salt, decomposing the reaction product with water, and isolating the product by methods which will be more fully hereinafter disclosed.

D. In the following example, which illustrates a preferred method of carrying out the invention, parts are by weight unless otherwise stated, and are illustrative of good practice, not limitations.

Example I

About 30 parts of well-dried $CF_3CCl_3$ and 0.5 part of a mixture of $Hg_2SO_4$ and $HgSO_4$ were cooled to about 0° C.; 40 parts of oleum (This sample contained about 65% $SO_3$.) were slowly added and the temperature was allowed to rise gradually to slightly above room temperature; the reaction was stopped when 83% of the total chlorine in the organic compound had been hydrolyzed; a test for F was nil; the reaction mixture was decomposed with ice water and barium carbonate was added; the mixture was evaporated to dryness; the solids were extracted with alcohol and the alcohol was evaporated from the extract; sulfuric acid was added and, after the completion of the reaction, the free $CF_3COOH$ was isolated by distillation. The product boiled at 72–73° C.

E. The hydrolysis may be carried out under pressure and higher temperature either in the presence or absence of a mercury catalyst. The free acid may be isolated by extraction or distillation.

F. This process is an improvement over the earlier method of preparing the acid, by the destructive oxidation of trifluoro-methyl-cyclohexane or trifluoro toluidine, being both technically and economically superior.

G. As many apparently widely different embodiments of this invention may be made without departing from the spirit and scope thereof, it is to be understood that we do not limit ourselves to the specific embodiments thereof except as defined in the appended claims.

We claim:

1. The method of making $CF_3COOH$ which comprises adding oleum to $CF_3CCl_3$, when the reaction is substantially complete decomposing the reaction mixture with water, and isolating the $CF_3COOH$.

2. The method of making $CF_3COOH$ which comprises adding oleum to $CF_3CCl_3$ in the presence of a mercury sulfate, when the reaction is substantially complete decomposing the reaction mixture with water, and isolating the $CF_3COOH$.

3. The method of making $CF_3COOH$ which comprises adding oleum to $CF_3CCl_3$ in the presence of $Hg_2SO_4$ and $HgSO_4$, when the reaction is substantially complete decomposing the reaction mixture with water, and isolating the $CF_3COOH$.

4. The method of making $CF_3COOH$ which comprises slowly adding about 40 parts of oleum containing about 65% $SO_3$ to about 30 parts of $CF_3CCl_3$ at about 0° C. in the presence of about 0.5 part of a mixture of $Hg_2SO_4$ and $HgSO_4$, when the reaction is about 83% complete decomposing the reaction mixture with water, and isolating the $CF_3COOH$.

ANTHONY F. BENNING.
JOSEPH D. PARK.